Figure 1:
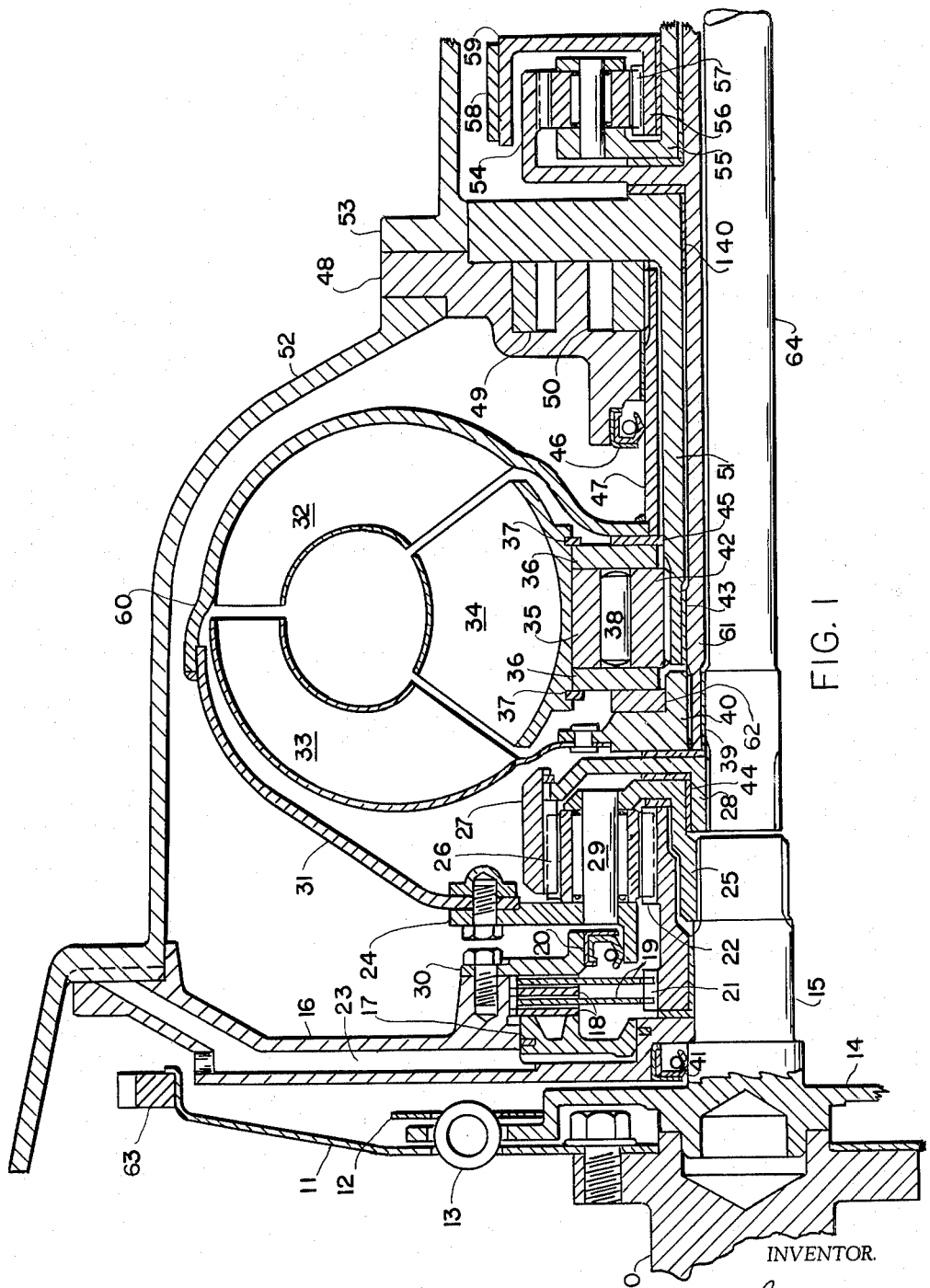

INVENTOR.
Howard W. Simpson.

INVENTOR.
Howard W. Simpson

United States Patent Office 3,217,563
Patented Nov. 16, 1965

3,217,563
**DUPLEX GEAR TRANSMISSION AND HYDRO-
DYNAMIC DRIVE COMBINATION**
Howard W. Simpson, Dearborn, Mich.; Gertrude H. Simpson and The Detroit Bank and Trust Company, co-trustees of the estate of said Howard W. Simpson, deceased
Filed Jan. 25, 1963, Ser. No. 253,939
6 Claims. (Cl. 74—688)

This invention relates to an overdrive gear when used in connection with a multi-speed transmission having a hydrodynamic drive. It is intended that such an overdrive is to be engageable in a motor vehicle at the will of the driver.

Operation of automobiles on today's fast highways results in excessive engine speeds with consequent poor fuel economy and high maintenance costs. An overdrive gear box could be used in an attempt to lower engine speeds with automatic transmissions, but this is not practical for several reasons. Firstly, a separate overdrive gear box is expensive and too bulky to fit readily into the already crowded underbody space of the average automobile.

Secondly, use of an overdrive with a transmission which includes a hydrodynamic drive, either of the torque converter or coupling type, results in excessive fluid slip, thus defeating the purpose of the overdrive. As a result overdrives are commonly used only with manual shift transmissions which do not incorporate fluid drives.

The present disclosures eliminate the above objections. The method shown and disclosed and described herein of integrating a simple planetary gear overdrive into an automatic transmission design using a fluid torque converter is believed to be novel because of several distinguishing features by which great simplicity, compactness and low cost are achieved, and by which fluid slip is eliminated.

For instance, using a selectively engageable planetary overdrive gear normally requires not only a separate clutch to release the driving ratio that has been in engagement, but also a reaction brake to engage the overdrive after the prior drive has been released. In the present combination, only the brake is added, as the previous drive is released by clutches already existing in the main transmission.

An object of the invention is therefore to provide a simple low cost overdrive device.

In order to eliminate the fluid slip of a converter, it is normally necessary to have a separate clutch to lock up the converter in solid mechanical drive but this is not needed in the present disclosure. It is achieved by arranging the input element of both the overdrive and the converter to be coupled directly to the engine at all times. This permits the main or multi-speed portion of the transmission combination to always be driven by the converter, but with the overdrive always coupled directly to the transmission output member through a hollow shaft in the main transmission, thus eliminating fluid slip when in overdrive.

Another object is therefore to provide a low cost means of by-passing the converter of an automatic transmission without use of a converter lock-up clutch but always retaining 100% converter drive in all reduction ratios and in the direct one to one ratio.

These and other advantages will be apparent from the following description and drawings in which FIG. 1 is a partial elevation in section of the preferred species of the integral overdrive and converter portion of the combination.

Figure 2:
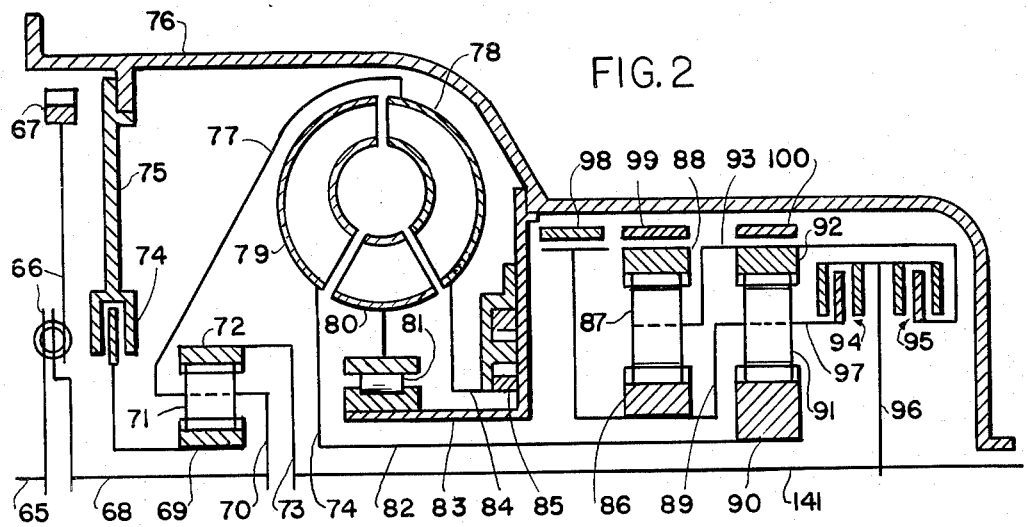

FIG. 2 is a diagrammatic partial elevation in section of the preferred species and includes the four speed planetary transmission shown in my U.S. Patent 2,838,960. In this species the friction member activating the overdrive is a brake which holds a reaction member stationary.

Figure 3:
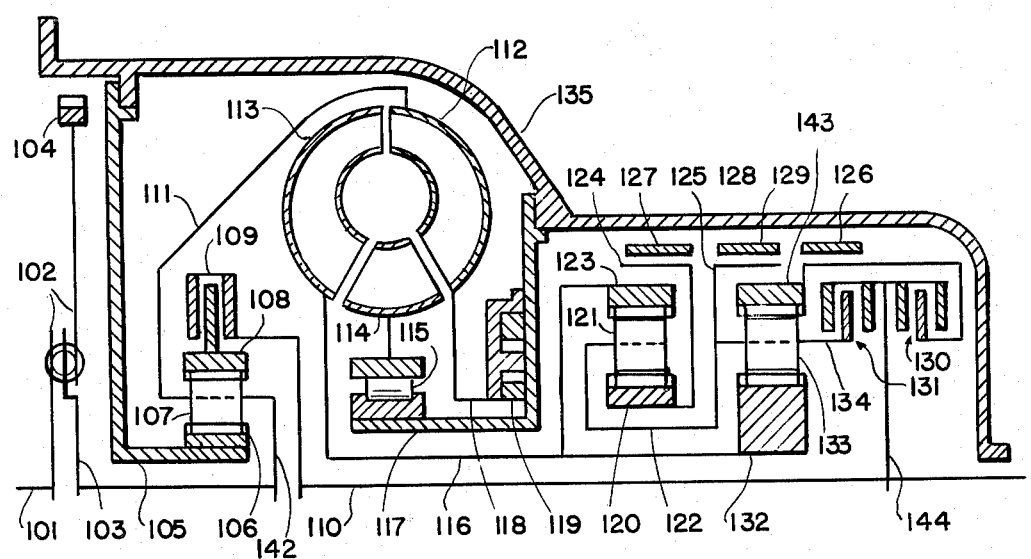

FIG. 3 is a diagrammatic partial elevation in section of an alternate species of the disclosure when combined with the four speed planetary transmission shown in my U.S. Patent 2,865,230. In this the friction member activating the overdrive is a clutch for coupling the overdrive output to the final output member of the transmission.

In FIG. 1 engine shaft 10 drives plates 11 and 12 which enclose and drive torsion vibration dampener springs 13 which in turn drive input shaft 15 which is splined to drive hub 25 of the overdrive planet gear carrier 24. Hub 25 has bushing 44 and is piloted on ring gear hub 28. Converter front shell 31 is attached to the carrier as shown and is welded to rear shell 60 which, with blades 32, form the converter pump. The engine can be cranked by starter gear 63 which is attached to plate 11. Planet gears 26, mounted on pins 29, mesh with ring gear 27 and sun gear 22 which is free to turn on input shaft 15.

Brake plates 19 are slideable on and drivingly engaged by teeth 21. Slideable driven brake plates 18 mesh with teeth in plate 16 which is attached to stationary housing 52.

Piston 17 is moveable in plate 16 under fluid pressure through passage 23 to engage brake plates 18 and 19 against end plate 30, thereby holding sun gear 22. Ring gear hub 28 is splined to output shaft 64 which drives the vehicle.

Turbine 33 is driven by fluid from the converter pump and has hub 40 which is splined to tubular shaft 61, which turns in bushings 43 and 140 in stationary pump cover 51. Output shaft 64 runs in bushing 39 in tubular shaft 61. Converter reactor 34 is held against backward rotation by one-way brake 38 which runs in raceway 35 attached to the reactor. Thrust washers 36 are held in place in the reactor by snap rings 37. Thrust washers 62 and 45 locate the reactor axially. Inner race 42 is splined to pump cover 51 and is thus held against rotation.

Pump 48 is clamped between housings 52 and 53 and is driven by tubular shaft 47 which is welded to rear shell 60. This drives pump 48 whenever the engine is running to supply oil under pressure for operating various clutch and brake servos in the transmission and also piston 17. Pump 48 also provides oil under low pressure through passages not shown to fill the entire converter and connected cavity of the overdrive unit.

Resilient oil seals 20 and 41 prevent oil leakage from the overdrive unit and oil seal 46 prevents oil leakage from the hub of pump 48.

Tubular shaft 61 is connected to drive ring gear 54 of the main transmission. Only a portion of the gearing is shown and includes ring gear 54, carrier 55, sun gear 56 and planet gears 57 and constitutes the front or left hand planetary set shown in the similar gear train of FIG. 3. Brake drum 59 is integral with sun gear 56 and brake band 58 operates to hold sun gear 56 as a reaction member.

In FIG. 2 engine shaft 65 drives connected plates 66 which drive input shaft 68. Planet gear carrier 70 and shell 77, connected to carrier 70, drive converter pump 78. Sun gear 69 is free to rotate except when held by disc brake 74 in plate 75 which is fixed to housing 76. Starter gear 67 transmits torque for starting through plates 66.

Planet gears 71 rotate in carrier 70 and mesh with ring gear 72 which is connected to output shaft 141 by hub 73. Turbine 79 is driven by converter pump 78 and is attached to tubular shaft 82 by hub 74.

Converter reactor 80 is held against backward rotation by one-way brake 81 mounted on the hub of pump 83 which is attached to housing 76. Pressure pump 85 is driven by tubular shaft 84 attached to converter pump 78.

Tubular shaft 82 drives the planetary gear set comprising sun gear 90, planet gears 91, ring gear 92 and planet gear carrier 97 which is joined to sun gear 86 of the other planetary gear set by web 89.

Planet gears 87 mesh with sun gear 86 and ring gear 88 and planet carrier 93 is connected to ring gear 92.

Brake bands 98, 99 and 100 are adapted to hold sun gear 86 and ring gears 88 and 92 upon successive operation of brake servos not shown. These in conjunction with clutch 94, driven by planet carrier 97, and clutch 95 driven by ring gear 92 provide four speeds forward and one in reverse with the final drive from the clutches transmitted to output shaft 141 by web 96.

In FIG. 3 engine shaft 101 drives connected plates 102 which drive input member 103. Carrier 142, front shell 111 and converter pump 112 being connected, are driven at all times by input member 103. Sun gear 106 is attached to plate 105 and is thus held stationary at all times as plate 105 is attached permanently to housing 135. Rotation of carrier 142 causes planet gears 107 to walk around sun gear 106 thus overdriving ring gear 108 and when clutch 109 is engaged, output shaft 110 is also overdriven.

Converter pump 112 drives turbine 114, hollow shaft 116, ring gear 123 and sun gear 132. Reactor 114 is held against backward rotation by one-way brake 115 which is grounded on pump housing 117.

Oil pressure for filling the converter and operating various clutches and reaction brakes is obtained from pump 119 driven by hollow shaft 118 whenever the engine is running.

Planet gears 121 mesh with ring gear 123 and sun gear 120. Interconnected planet gear carriers 122 and 134 drive clutch 131. Planet gears 133 mesh with ring gear 143 and sun gear 132 and clutch 130 is driven by ring gear 143. Output shaft 110 can be driven by clutches 130 or 131 through web 144.

The multi-speed portion in FIGS. 1, 2 and 3 is shown only as examples as the invention can be applied to any transmission which has a hollow shaft to permit the overdrive to by-pass it.

Operation FIG. 1

When the vehicle engine is started pressure pump 48 fills the converter with oil under low pressure and centrifugal force rotates oil counter clockwise in the plane of the drawing thus driving turbine 33 and gearing in the main transmission. When the low speed clutch and brake in the main transmission are engaged, output shaft 64 and ring gear 27 begin to turn forward slowly.

Since carrier 24 is rotating at engine speed, which is faster than that of ring gear 27, sun gear 22 and plates 19 will rotate forward at faster than engine speed. Piston 17 is pushed to the left by oil pressure in the overdrive cavity and so does not apply braking force.

The speed of ring gear 27 is increased with each successively higher speed in the main transmission until direct drive becomes engaged at which time all members rotate substantially at engine speed but with ring gear 27 turning slightly slower than carrier 24 and sun gear 22 turning slightly faster due to fluid slip of the converter. At this time the main transmission is locked up in direct drive by the clutches but the converter is not locked up and continues to drive through fluid as desired.

When a speed of travel is reached such that it becomes desirable to step down the engine speed to improve economy and reduce noise, the driver can release the main clutches and apply oil pressure to the overdrive brake through passage 23. Since this oil pressure is greater than that in the overdrive cavity, piston 17 is moved to the position shown in FIG. 1 and engages brake plates 18 and 19. This stops rotation of sun gear 22 and causes carrier 24 to slow down.

If sun gear 22 has half as many teeth as ring gear 27 the engine will slow down one third provided the accelerator is depressed slightly to maintain the same engine torque and road speed as before.

Thus, although the gear unt is referred to as an overdrive, its purpose is to reduce engine speed. Since manual operation is intended, no special timing of the shift from the main clutches to the overdrive brake is required as the driver can easily release the accelerator momentarily, when engaging overdrive, to obtain a smooth shift.

Operation FIG. 2

Since the overdrive carrier 70, converter pump 78 and pressure pump 85 are directly connected to the engine shaft 65, these members rotate at engine speed at all times. There is no output torque from either the overdrive or the converter at low engine speeds but at increased engine speed, the converter turbine 79 drives hollow shaft 82 and sun gear 90 forward. Output shaft 141 remains stationary until one of brake bands 98, 99 and 100 and also one of the clutches 94 and 95 are engaged. The sequence of operation of these members to obtain four speeds forward and one in reverse is described in detail in the aforementioned U.S. Patent 2,838,960.

While output shaft 141 is turning at the various speeds dictated by the four speed unit, the overdrive runs idle until such time as the operator wishes to take advantage of it. The overdrive could be engaged automatically by well known governor controlled hydraulic valving when a road speed of 45 m.p.h., for instance, were reached but positive manual operation of the valving is believed to be preferable. The valving is arranged to release clutches 94 and 95 and engage brake 74 simultaneously. This permits the converter, main transmission gears, and the engine to slow down about one third if the pitch diameter of sun gear 69 is half that of ring gear 72 as shown in FIG. 2. Since clutches 94 and 95 are now released the converter and main transmission members turn idly and the overdrive ring gear 72 picks up the load and drives the vehicle output shaft 141.

Operation FIG. 3

The operation of this species is the same as that of FIG. 2 but a plate clutch 109 is used to engage the overdrive instead of the disc brake 74 in FIG. 2.

In FIG. 3 sun gear 106 is always stationary and ring gear 108 always turns about 50% faster than engine speed if its pitch diameter is twice that of sun gear 106 as shown. When clutches 130 and 131 are released the converter turbine 113 and main transmission members turn idly as they are still being driven by the converter, but no power can be transmitted to output shaft 110 until overdrive clutch 109 is engaged. When this is done planet carrier 142, input member 103 and engine shaft 101 are slowed down one third, with reference to the speed of output shaft 110. If overdrive is engaged before the high or direct drive speed is reached in the main transmission the vehicle engine may lug due to insufficient speed and this procedure is to be avoided as the overdrive does not act as a splitter of the main transmission ratios.

I claim:

1. An automotive fluid torque converter for transmitting engine power through a multi-speed gear type transmission and having an overdrive for transmitting and by-passing engine power around the torque converter and the transmission, comprising: a stationary housing, with a pump, a turbine driven by said pump and a reactor member fitted within said housing, the reactor member being anchored to said housing to thereby form a fluid torque converter; an engine driven driveshaft and an axially aligned driven shaft fitted in said housing, the driven shaft being surrounded by a co-axial, hollow transmission shaft; an overdrive gear set, separate from the transmission, comprising a sun gear surrounding the driveshaft and in turn surrounded by a ring gear connected to the driven shaft, the sun and ring gears being separated by and meshed with planetary gears mounted upon a carrier connected to both the driveshaft and the pump so that rotation of the drive shaft simultaneously rotates said carrier and pump; said turbine being connected to and rotatable with said hollow shaft, and said hollow shaft being arranged for connection to a multi-speed gear type transmission, wherein power from the driveshaft is normally transmitted through the pump and turbine to the hollow shaft and then to the transmission; a single brake means connected to the housing and the sun gear for selectively fixing the sun gear against rotation relative to the housing, wherein upon operation of said brake means, overdrive power is transmitted through said carrier and planetary gears and the ring gear directly to the driven shaft for thereby bypassing the torque converter and transmission; and means for connecting said transmission with said driven shaft.

2. An automotive fluid torque converter for transmitting engine power through a multi-speed gear type transmission and having an overdrive for transmitting and bypassing engine power around the torque converter and the transmission, comprising: a stationary housing, with a pump, a turbine driven by said pump and a reactor member all fitted within said housing, with the reactor member being anchored to said housing, to thereby form a fluid torque converter; an engine driven driveshaft and an axially driven shaft fitted within said housing, the driven shaft being surrounded by a co-axial, hollow transmission shaft; an overdrive gear set comprising a sun gear surrounding the driveshaft and in turn surrounded by a ring gear, with planetary gears arranged between and meshing with both the sun and ring gears, the planetary gears being mounted upon a carrier connected to both the driveshaft and the pump so that rotation of the driveshaft simultaneously rotataes said carrier and pump; means for connecting the sun gear to the housing and means for connecting the ring gear to the driven shaft, one of said means being a fixed connection and the other of said means being a selectively operable means; said turbine being connected to and rotatable with said hollow shaft, and said hollow shaft being arranged for connection to an automotive type multi-speed, gear transmission; wherein engine power from the driveshaft is normally transmitted through said carrier to the pump, then through the turbine and hollow shaft to the transmission, but wherein operation of said selectively operable means results in said power being transmitted through the overdrive gear set to the driven shaft, thereby bypassing the torque converter and the transmission; and means for connecting said transmission with said driven shaft.

3. A construction as defined in claim 2, and wherein the means for connecting the sun gear to the housing is fixed to thus hold the sun gear against rotation, and the means for connecting the ring gear to the driven shaft comprises a clutch means.

4. An automotive fluid torque converter for transmitting engine power through a multi-speed gear type transmission and having an overdrive for transmitting and bypassing engine power around the torque converter and transmission, comprising: a stationary housing having a forward end and a rear end; an engine driven driveshaft extending into the forward end of the housing; a driven shaft arranged in the housing in axial alignment with the driveshaft and extending out the rear end of the housing, and a hollow output shaft co-axial with and surrounding the driven shaft; a torque converter shell in the form of a circular, generally U-shaped in cross-section, inwardly opening, wall member arranged inside the housing, surrounding and transverse to the hollow shaft; pump blades formed on the interior of the shell so that the shell forms a pump, and a circular turbine fitted within said shell for being driven by said pump; a circular shaped converter reactor arranged in said shell at its opening, that is, inwardly of the shell, between the inner portions of the turbine and the pump blades; said housing having an integral collar portion surrounding a portion of said hollow shaft and arranged between the shell and hollow shaft and extending forwardly to said reactor; and said reactor being anchored to said collar portion through a one way brake means for thereby anchoring the reactor to the stationary housing; the inner edges of the shell wall being rotatably sealed to the housing and the shell containing fluid; said turbine being connected to said hollow shaft for rotation therewith; and the rear portions of said hollow shaft being arranged for connection to a multi-speed, automotive gear type transmission arranged at the rear of said housing; an overdrive gear set arranged within said housing near the forward end thereof, and consisting of a sun gear surrounding the driveshaft, a ring gear surrounding the sun gear and planet gears arranged between and meshing with the sun and ring gears; said planet gears being mounted upon a carrier connected to the driveshaft and also connected to the forward wall portion of said shell, wherein rotation of the driveshaft rotates the carrier and the shell and thus, the pump; means for connecting the sun gear to a forward end portion of the housing and means for connecting the ring gear to the driven shaft, with one of such means being a direct, fixed connection and the other of such means being a selectively operable means; whereby in normal operation engine power is transmitted through the driveshaft to said carrier and then through the shell to the pump which thereby fluid drives the turbine to thus transmit the power through the hollow output shaft to the transmission, but operation of such selectively operable means results in the power from the driveshaft being transmitted through the overdrive gear set to the driven shaft, thereby bypassing the torque converter and the transmission; and means for connecting said transmission with said driven shaft.

5. A construction as defined in claim 4 and wherein the means for connecting the ring gear to the driven shaft comprises a carrier means fixedly connected to the ring gear and to the driven shaft so that the ring gear rotates with the driven shaft at all times; and the means for connecting the sun gear to the housing comprises a brake, which is mounted upon said housing for selectively fixing the sun gear relative to the housing.

6. A construction as defined in claim 4, and wherein the means for connecting the sun gear to the housing is fixed to thus hold the sun gear against rotation, and the means for connecting the ring gear to the driven shaft comprises a clutch.

References Cited by the Examiner

UNITED STATES PATENTS

| 2,390,645 | 12/1945 | Frank | 74—688 |
|---|---|---|---|
| 2,725,762 | 12/1955 | Hettinger et al. | 74—688 |
| 2,736,407 | 2/1956 | Smirl | 74—688 |
| 2,755,688 | 7/1956 | Swennes | 74—688 |
| 2,829,542 | 4/1958 | Swennes | 74—688 |
| 2,838,960 | 6/1958 | Simpson | 74—759 |
| 2,865,230 | 12/1958 | Simpson | 74—759 |

DON A. WAITE, *Primary Examiner.*